US012731048B2

(12) United States Patent
Zhang

(10) Patent No.: US 12,731,048 B2
(45) Date of Patent: Sep. 8, 2026

(54) MACHINE LEARNING MODEL TO ESTIMATE NETWORK COSTS

(71) Applicant: Stripe, LLC, South San Francisco, CA (US)

(72) Inventor: Qi Zhang, San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 1177 days.

(21) Appl. No.: 17/339,336

(22) Filed: Jun. 4, 2021

(65) Prior Publication Data

US 2021/0383260 A1 Dec. 9, 2021

Related U.S. Application Data

(60) Provisional application No. 63/035,600, filed on Jun. 5, 2020.

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ................................ G06N 5/04; G06N 20/00
See application file for complete search history.

(56) References Cited

U.S. PATENT DOCUMENTS 10,402,807 B1 * 9/2019 Iyer .......................... G06N 5/04
11,494,633 B2 * 11/2022 Guim Bernat ........... G06N 5/04
2005/0096990 A1 * 5/2005 Algiene ................. G06Q 40/02 705/21
2012/0078790 A1 * 3/2012 Ornce .................... G06Q 20/40 705/44
2014/0101037 A1 * 4/2014 Ornce .................. G06Q 20/409 705/40
2014/0129358 A1 * 5/2014 Mathison ............. G06Q 20/204 705/17
2016/0371682 A1 * 12/2016 Sprague ................. G06Q 20/20
2019/0114627 A1 * 4/2019 Tang ...................... G06Q 20/00
2020/0302450 A1 * 9/2020 Misra ................. G06Q 30/0185
2020/0320534 A1 * 10/2020 Yerradoddi ........ G06Q 10/0833
2023/0196358 A1 * 6/2023 Cohn .................. G06Q 20/401 705/44

* cited by examiner

*Primary Examiner* — Tewodros E Mengistu
(74) *Attorney, Agent, or Firm* — BAKERHOSTETLER

(57) ABSTRACT

The subject technology generates training data based at least in part on reporting data from a card network. The subject technology trains a machine learning model based on the training data. The subject technology determines, using the machine learning model, a fee description for a transaction. The subject technology determines a variable rate and a fixed amount based at least in part on the fee description. The subject technology determines at least one cost based at least in part the variable rate and the fixed amount for each transaction from a set of transactions. The subject technology evaluates at least one result against second reporting data. The subject technology provides, for display, the at least one cost and the at least one result on a display of a client device.

20 Claims, 7 Drawing Sheets

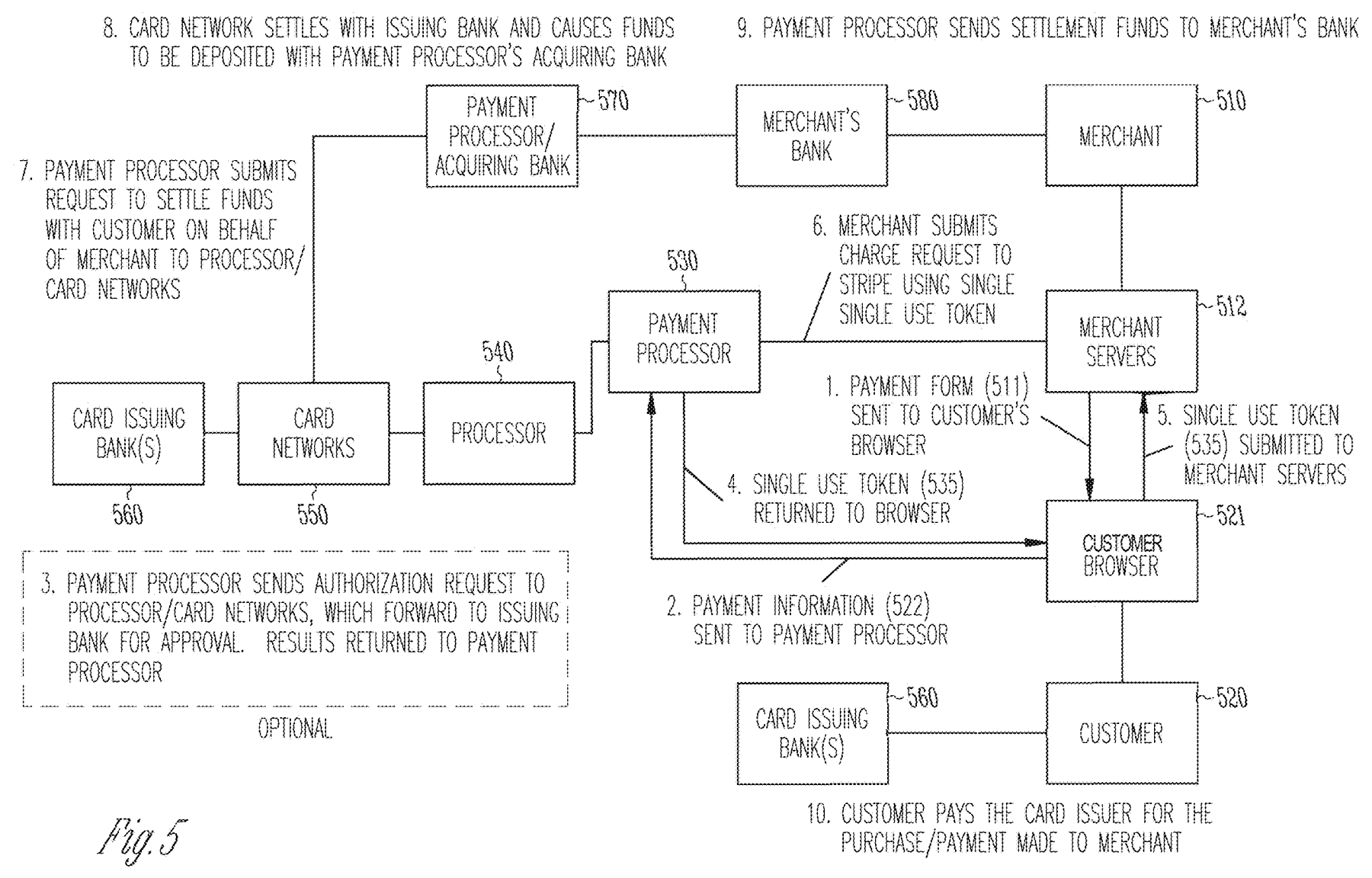

8. CARD NETWORK SETTLES WITH ISSUING BANK AND CAUSES FUNDS TO BE DEPOSITED WITH PAYMENT PROCESSOR'S ACQUIRING BANK

9. PAYMENT PROCESSOR SENDS SETTLEMENT FUNDS TO MERCHANT'S BANK

PAYMENT PROCESSOR/ ACQUIRING BANK 570

MERCHANT'S BANK 580

MERCHANT 510

7. PAYMENT PROCESSOR SUBMITS REQUEST TO SETTLE FUNDS WITH CUSTOMER ON BEHALF OF MERCHANT TO PROCESSOR/ CARD NETWORKS

CARD ISSUING BANK(S) 560

CARD NETWORKS 550

PROCESSOR 540

PAYMENT PROCESSOR 530

6. MERCHANT SUBMITS CHARGE REQUEST TO STRIPE USING SINGLE SINGLE USE TOKEN

MERCHANT SERVERS 512

5. SINGLE USE TOKEN (535) SUBMITTED TO MERCHANT SERVERS

1. PAYMENT FORM (511) SENT TO CUSTOMER'S BROWSER

4. SINGLE USE TOKEN (535) RETURNED TO BROWSER

CUSTOMER BROWSER 521

2. PAYMENT INFORMATION (522) SENT TO PAYMENT PROCESSOR

3. PAYMENT PROCESSOR SENDS AUTHORIZATION REQUEST TO PROCESSOR/CARD NETWORKS, WHICH FORWARD TO ISSUING BANK FOR APPROVAL. RESULTS RETURNED TO PAYMENT PROCESSOR

OPTIONAL

CARD ISSUING BANK(S) 560

CUSTOMER 520

10. CUSTOMER PAYS THE CARD ISSUER FOR THE PURCHASE/PAYMENT MADE TO MERCHANT

*Fig. 5*

MACHINE LEARNING MODEL TO ESTIMATE NETWORK COSTS

CROSS-REFERENCE TO RELATED APPLICATIONS

This application claims priority to U.S. Provisional Patent Application Ser. No. 63/035,600, filed Jun. 5, 2020, entitled "MACHINE LEARNING MODEL TO ESTIMATE NETWORK COSTS," and the contents of which is incorporated herein by reference in its entireties for all purposes.

TECHNICAL FIELD

The subject matter disclosed herein generally relates to the technical field of machine learning models utilized in a network-based computing environment.

BACKGROUND

The present subject matter seeks to address technical problems existing in payment processors and systems.

BRIEF DESCRIPTION OF THE DRAWINGS

Some embodiments are illustrated by way of example and not limitation in the figures of the accompanying drawings.

FIG. 5 is a block diagram showing aspects of an online method for conducting a transaction between a merchant site and an electronic user device using a payment processor, according to an example embodiment.

DETAILED DESCRIPTION

Figure 1:
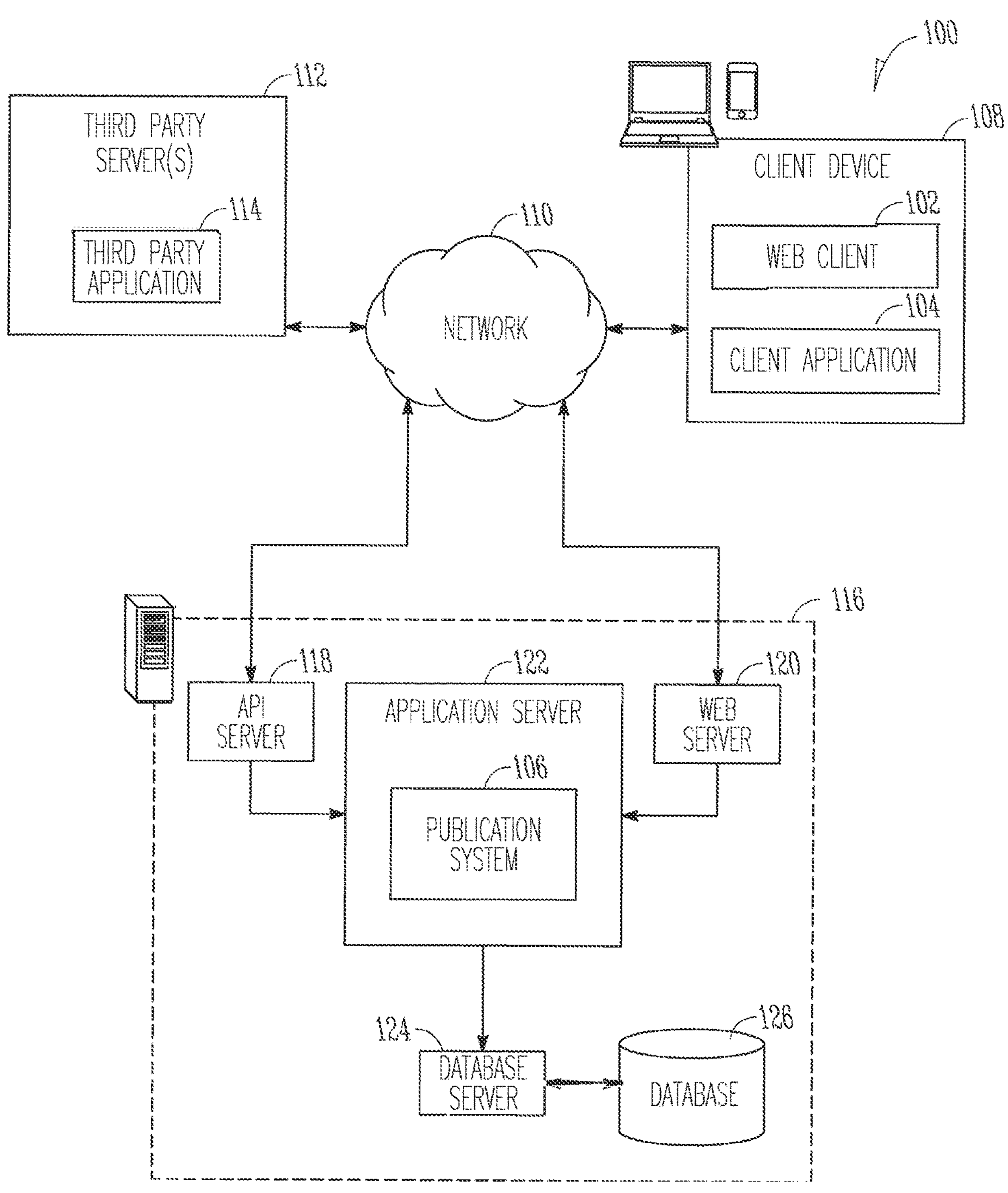
FIG. 1 is a block diagram illustrating a high-level network architecture, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A networked system as described herein can estimate network costs to generate bills (e.g., for requesting payment of associated costs) for users during a given month, and make adjustments in the following month to the reported actuals. Network costs refer to fees that are incurred as part of a payment processor performing transactions with a given card network, which are initially paid by the payment processor on behalf of associated merchant (or customer) of the transaction, and then in turn are billed or invoiced to the merchant or customer for reimbursement/payment.

Existing cost rules, in their complexity, represent the legacy of many years of industries negotiating fees with card networks. The rules in an example are in the same shape as 2.9%+30c, but the permyriad and fixed amount can vary due to negotiations. One example of a rule is 1.65%+0c for a transaction if the transaction is 1) from a given merchant, 2) amount less than $2000, 3) being domestic (non cross-border), 4) for commercial usage, 5) settled in the EU area, 6) time between auth and capture is within five days, 7) not a recurring payment, 8) using a credit card, and 9) buying electronic goods.

In some existing systems, the costs rules were hard-coded in manual decision trees and configuration files. Further, the rules were extracted from electronic documents periodically sent from card networks, which were computationally intensive in utilization of computing resources in a given computer(s). In some instances, a given card network may not provide an update regarding new rules. Therefore it may be a burden and computationally intensive to manage such rules manually or in an ad-hoc manner: e.g., encoding from electronic documents is the first step, but after that the rules can change as a new negotiation(s) occurs, and when additional countries/geographic regions or areas are involved there can be a new set of rules. Thus, the subject technology automates, though machine learning techniques, operations to determine such costs (or fee rates as mentioned further herein) that reduces utilization of computational resources of hardware and/or software components described in embodiments further herein, thereby providing improvements in the functionality of a computer(s). Moreover, embodiments of the subject technology more quickly and efficiently determine such costs (e.g., fee rates) to further decrease the utilization of computing resources (e.g., processor, memory, network, and the like).

Consequently, keeping rules accurately up-to-date is computationally laborious and problematic. A given card network may also need to encode those complex rules in its respective code base, and it is possible to expect that two sets of users (or machines/computers) would need to get in sync with very tedious and complex rules.

Additionally, a given card merchant may not notify the subject system how the direct deals look like with merchants (e.g., where deals are partially based on the merchant's annual volume with the card merchant), and does not specify how the discount rules are applied, which can result in less accurate determined network costs. Discount rules, as mentioned herein, refers to rules that determine a fee rate charged by a card network for a given transaction, where such rules can be based on a volume of transactions (e.g., a number of transactions over a given period of time such as a month, a year, and the like) among other types of conditions, signals, and factors.

Embodiments of the subject technology address at least some or all of the aforementioned issues by providing and utilizing a machine learning model to estimate network costs that are adapted, in an automated manner, to more accurately determine cost rule changes.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor 530) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
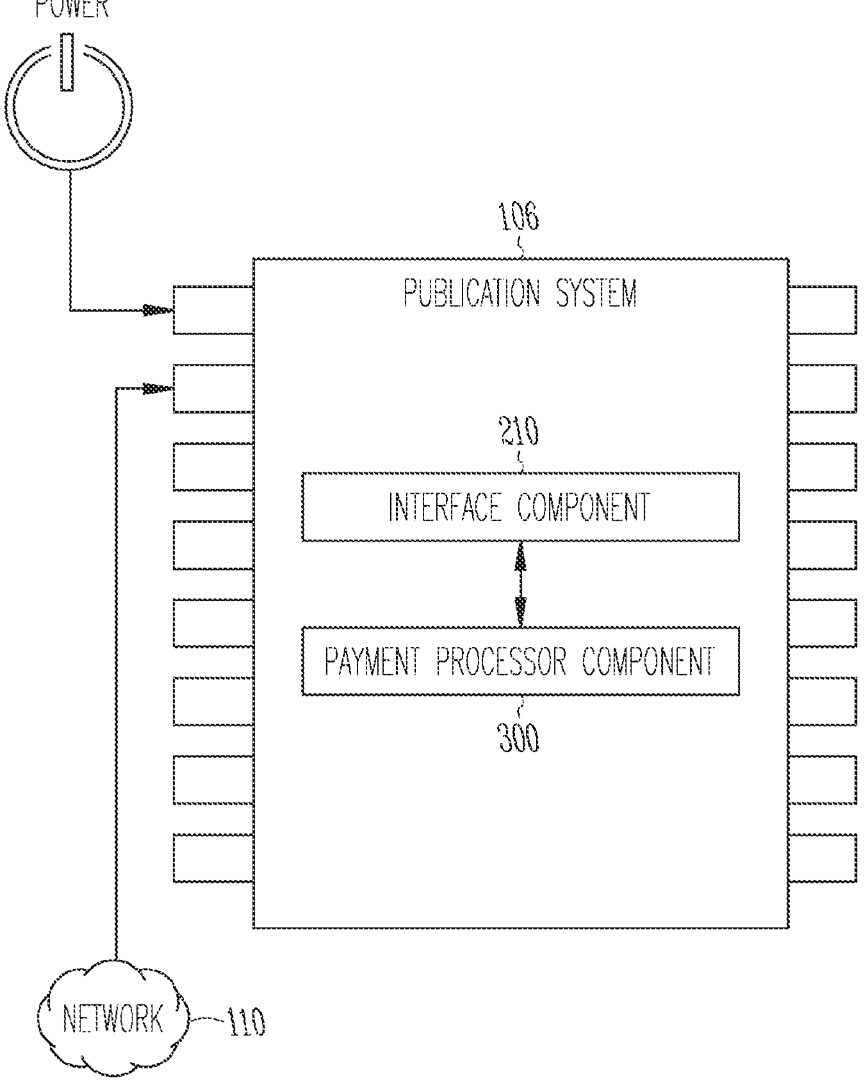
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide payment processing functions for a payment processor (e.g., a payment processor 530, FIG. 5) in accordance with the methods described herein with reference to the accompanying drawings.

Figure 3:
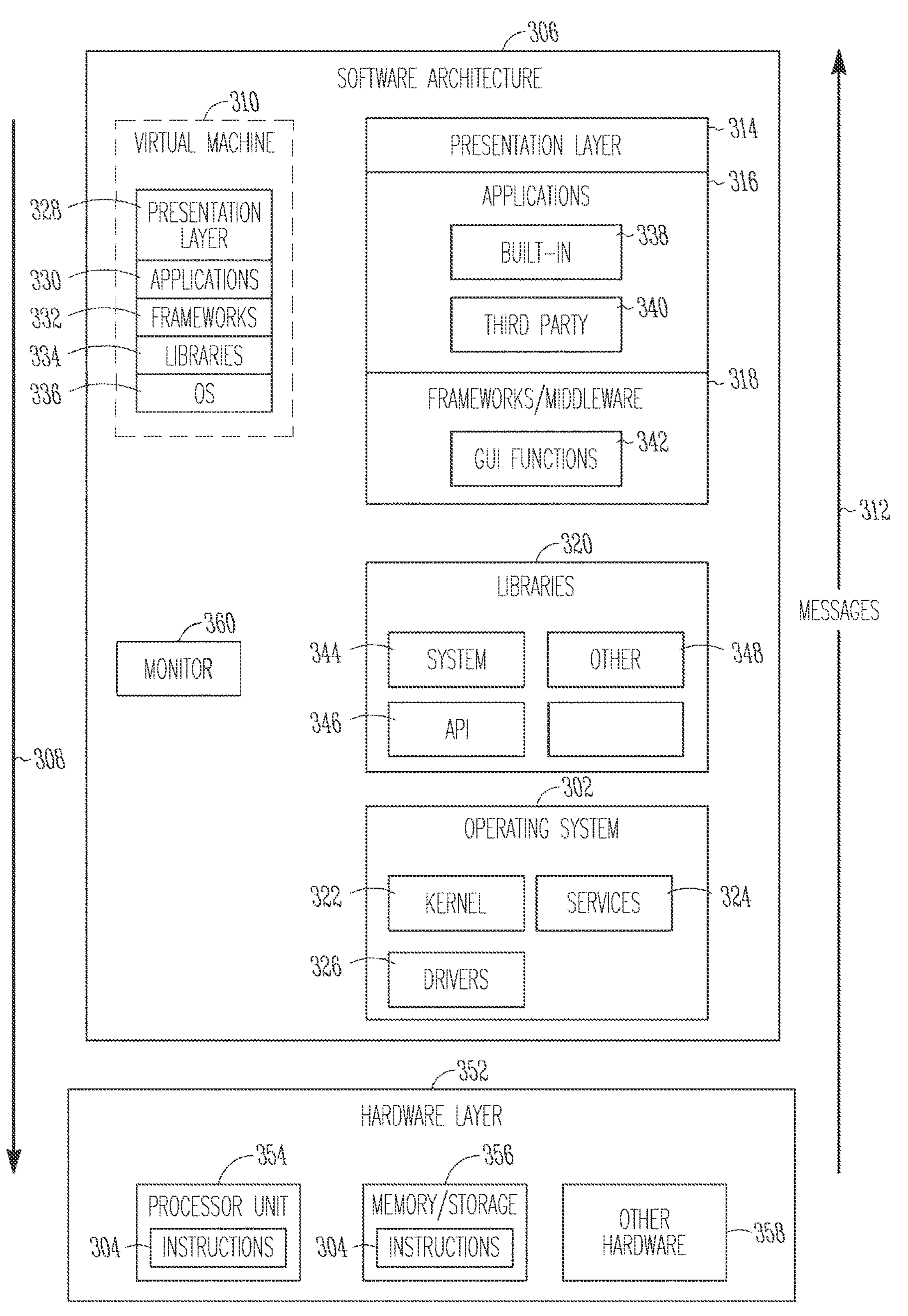
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
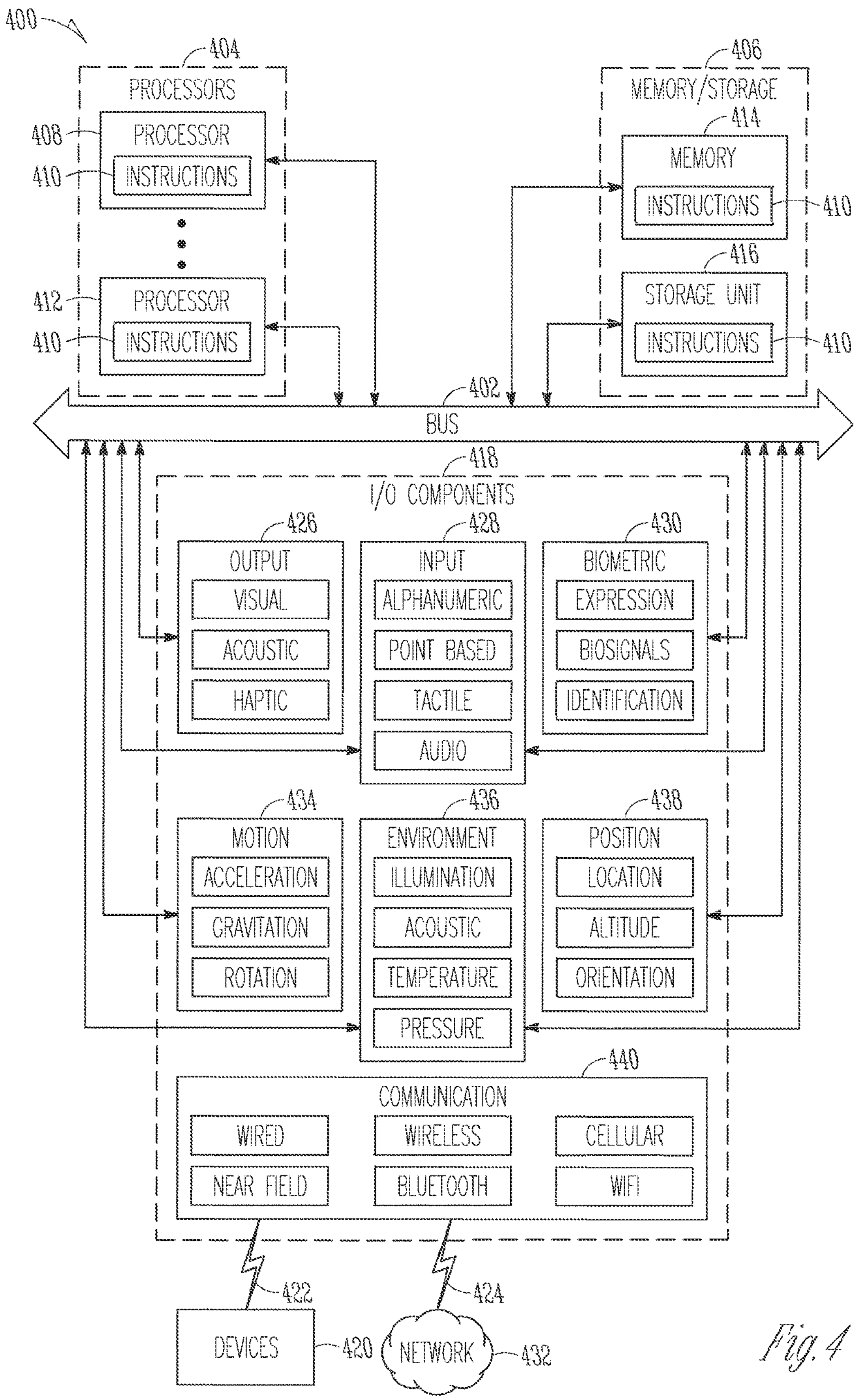
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a non-transitory machine-readable medium (e.g., a non-transitory machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth®components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JavaScript library can be embedded into a merchant's checkout form to handle credit card information. When a user attempts to complete a transaction using the checkout form, it sends the credit card information directly from the user's browser to the payment processor's servers. The JavaScript library provides merchants with a set of technologies that can be easily and quickly integrated to securely accept payments online. With the JavaScript library, merchants retain full control of their customers' payment flows, but their servers are never exposed to sensitive payment information.

When added to a merchant's payment form, the JavaScript library automatically intercepts the payment form submission, sending payment information directly to the payment processor and converting it to a single-use token. The single-use token can be safely passed to the merchant's systems and used later to charge customers. Merchants have complete control of their customers' payment experience without ever handling, processing, or storing sensitive payment information.

Viewed generally in one example, and with reference to FIG. 5, a payment processing flow is now described:

1. The merchant's customer 520 uses an Internet-enabled browser 521 to visit the merchant's site. The customer 520 is served a JavaScript library-enabled payment form 511 using standard web technologies. The customer 520 enters the specified information including their payment information 522 and submits the payment form 511. The billing info portion of the payment form 511 is for payment via a credit card or debit card. If payment is to be made via an ACH transaction, the billing info portion of the payment form 511 will request a bank routing number and an account number within that bank, and possibly additional information, such as the bank name and whether the account is a checking or savings account.
2. The customer's payment information 522 is sent from the customer's browser 521 to the payment processor 530, never touching the merchant servers 512. In this manner, the client-side application electronically sends payment information retrieved from the customer's electronic device to the payment processor 530. The client-side application does not send the payment information 522 to the server-side application.

3. In one preferred embodiment, the payment processor 530 submits the relevant transaction to a processor 540 or directly to the card network 550 for authorization or validation of the payment information. The card network 550 sends the request to the card issuing bank 560, which authorizes the transaction. In this embodiment, the payment processor 530 and the processor 540/card network 550 function together as a payment processor. In another example embodiment, this step is performed without any communication to the processor 540/card network 550. Instead, the payment processor 530 performs its own authorization or validation of the payment information using heuristic means, such as by checking the Bank Identification Number (BIN), also referred to as the Issuer Identification Number (IIN), against a database of known, valid BINs on file with the payment processor 530. (The BIN is a part of the bank card number, namely the first six digits.) In yet another example embodiment, this step is not performed at all since the authorization or validation is not necessary for the next step (4) to succeed. That is, it is acceptable to create a single-use token in step (4) that represents payment information which has not been validated in any way.
4. If authorized, the payment processor 530 will generate and return a secure, single-use token 535 to the customer's browser 521 that represents the customer's payment information but does not leak any sensitive information. In the example embodiment wherein step (3) is not performed, the payment processor 530 performs this step without waiting to receive authorization from the processor 540 or the card network 550. In this manner, the payment processor 530 creates the token 535 from the payment information sent by the client-side application, wherein the token 535 functions as a proxy for the payment information 522.
5. The payment form 511 is submitted to the merchant servers 512, including the single-use token 535. More specifically, the payment processor 530 sends the token 535 to the client-side application, which, in turn, sends the token 535 to the server-side application for use by the server-side application in conducting the transaction.
6. The merchant 510 uses the single-use token 535 to submit a charge request to the payment processor 530 (or to create a customer object for later use). In this step, the payment processor 530 submits a request to authorize the charge to the processor 540 or directly to the card network 550. This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (a so-called "card on file" scenario). Using the process described in steps (1) through (6), the payment information can be used by the server-side application via the token 535 without the server-side application being exposed to the payment information.
7. The payment processor 530 settles the charge on behalf of the merchant 510 with the processor 540 or directly with the card network 550.
8. The card network 550 causes the funds to be paid by the card issuing bank 560 to the payment processor 530 or to the payment processor's acquiring bank 570.
9. The payment processor 530 causes the settled funds to be sent to the merchant 510 (or to the merchant's bank 580), net of any applicable fees.
10. The card issuing bank 560 collects the paid funds from the customer 520.

Not all of the steps listed above need happen in real time. Other examples, arrangements, and functionality are possible. Applicant's published patent application US 2013/0117185 A1 is incorporated by reference in its entirety in this regard. Typically, when the merchant's customer submits the payment form in step (1), steps (1) through (6) happen in real time and steps (7) through (10) happen later, usually once per day, as a batch process settling all of the funds for all of the payment processor's merchants. In some examples, the payment processor uses an HTTP-based tokenization API in steps (2) and (4) above. Some broader examples may be considered as "tokenization as a service," in which any data is tokenized. One general example may facilitate a merger and acquisition (M&A) analysis in which companies want to compare an overlap in their customer bases. A payment processor (acting as a tokenization service) can tokenize the customers of each company and compare the overlap without revealing confidential information to either party. Unique payment tokens can be adapted to enable and facilitate such a tokenization service.

Aspects of the present disclosure use technical signals observable from the checkout page of a purchase transaction funnel to generate new data representative of inferences about a customer's experience in making a particular purchase. In some examples, the technical signals are observable exclusively from, or can only be extracted from, a checkout page of a purchase transaction funnel. In some examples, the data is extracted from novel sources and includes data previously denied to service providers as being too difficult or cumbersome to extract. The extracted new data can be structured and presented in novel ways to provide feedback to a merchant, for example, to improve technical services such as a checkout flow or payment experience. As described further above, conventional transactional systems have been blind to this data, or lacked the technology to access it.

As discussed before, embodiments of the subject technology advantageously provide a machine learning model to estimate networks costs in view of predicted changes to costs (e.g., fee rates) from a given card network(s), which reduces utilization of computational resources (e.g., processor, memory, network, and the like) thereby improving the functionality of a computer (e.g., payment processor 530, machine 400, software architecture, and the like).

Compared with previous machine learning approaches that predicted a fee amount directly and with lower accuracy, the subject technology provides machine learning approaches that instead predict an "id" from the card networks' reporting data that identifies a fee using a decision tree, where the "id" is generally is a description about the fee. Each rule can be in the same shape or format as 2.9%+30c, and with a few data points from the same rule, a machine learning model provided by embodiments herein can predict the variable and fixed amount with a linear regression. In the above examples, "2.9%" corresponds to a variable rate, and 30c (e.g., thirty cents) corresponds to a fixed cost (or constant value), and it is appreciated that such values associated with the variable rate and/or the fixed cost can vary.

For automated adaptation to the rule changes, the subject technology samples the most recent few data points from each category where the definition of a category can be derived from iterations and different for each card network.

As mentioned above, a network cost (e.g., cost or fee rate) for a given card network (e.g., card network 550) compensates the card network for processing a transaction, and is typically paid by the payment processor (e.g., payment processor 530). Such network costs can be based on a contractual agreement between an issuing financial institution (e.g., associated with the card network) and an acquiring financial institution (e.g., associated with the payment processor). In some instances, such costs are established based on a agreement between a merchant and an issuing financial institution. It is further appreciated that the network costs or fee rates can change (e.g., be dynamic over the passage of time) when certain conditions or rules are met (e.g., a volume or number of transactions, a type of card involved in a transaction, or a category of customer or card involved in a transaction, and the like).

In some examples, example network costs or rate fees can apply to transactions in a given geographic location (e.g., United States) and charged to accounts issued in the same geographic location, and other network costs can apply to transactions submitted in other countries.

Moreover, fees can be based on a type of card product (e.g., consumer, business, corporate, and the like) under which the account associated with the card is issued. In some instances, an amount of a given transaction has to be above a threshold amount for the transaction to be charged a particular fee rate (e.g., where a fee rate may be increased or decreased based on the transaction amount).

In some examples, a fee rate (or network cost) is based on a percentage of a transaction amount and a constant value per transaction. A percentage amount (e.g., variable rate) for the fee rate may be in the range of 1.25% to 3.5%. A constant value (e.g., fixed cost) per transaction may be in the range of $0.10 to $0.40. It is appreciated, that different combinations of the aforementioned percentage amount and constant value may be utilized by various card networks.

Determining such network costs or fee rates can be important to the operations of a payment processor or merchant in order to estimate expected business costs where the payment processor or merchant can rely on such estimate costs or fee rates to better tailor (e.g., determine a limit) a number of transactions that are to be processed over a time period (e.g., monthly or annually).

Figure 6:
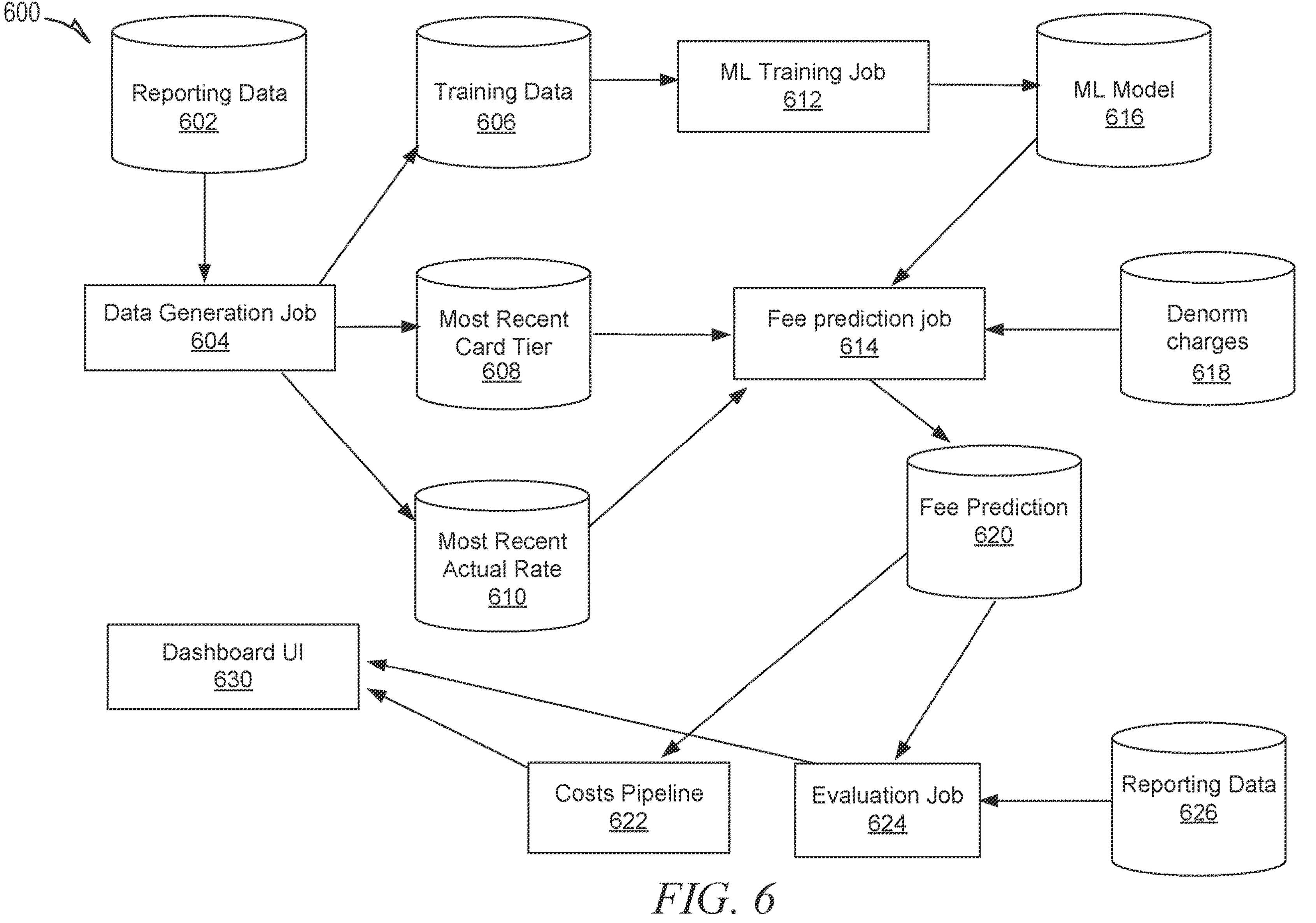
FIG. 6 is conceptual illustration of a data flow diagram for determining network costs in an example software architecture, in accordance with some embodiments of the present disclosure.

FIG. 6 is conceptual illustration of a data flow diagram for predicting network costs in an example software architecture 600, in accordance with some embodiments of the present disclosure.

As illustrated in FIG. 6, the software architecture 600 includes reporting data 602, data generation job component 604, training data 606, most recent card tier data 608, most recent actual rate data 610, ML training job component 612, fee prediction job component 614, ML model data 616, denorm charges 618, fee prediction data 620, costs pipeline component 622, evaluation job component 624, reporting data 626, and a dashboard UI component 630.

Each of the aforementioned components in FIG. 6 can be provided or implemented utilizing various hardware or software components (e.g., instructions stored in hardware memory which is then executed by a given hardware processor to perform operations) such as the processor 540, the payment processor 530, the machine 400 and/or the software architecture 306.

In an implementation, data generation job component 604, using reporting data 602, generates training data 606, most recent card tier data 608, and most recent actual rate data 610. In an example, training data 606 includes the most recent 3 samples for a (seid, card number) pair from reporting data 602. In an implementation, reporting data 602 can include information related to transactions that have been processed by a given card network (e.g., card network 550) and may include associated fee rates charged by the card network for each transaction.

In an implementation, ML training job component 612, using training data 606, trains a machine learning model and stores the trained machine learning model in ML model data 616. In an example, the machine learning model may be a classifier model that utilizes features including seid, bin, last4, card type (e.g., credit, debit or prepaid), among others, to predict a fee description associated with the seid and card number pair.

In the above example of features for the machine learning model, seid refers to the merchant ID with the card network (e.g., associated with a given card issuer or financial institution), bin refers to a bank identification number, last4 refers to the last four numbers of the credit card or payment card, and card type indicates a type of card.

In an implementation, fee prediction job component 614, using the trained ML model from ML model data 616, determines a fee prediction based at least in part on most recent card tier data 608 and most recent actual rate data 610. In an example, fee prediction job component 614 predicts a fee description using the trained ML model, and performs a look up for the rate from most recent actual rate data 610 based on the fee description. The fee prediction job component 614, in an example, provides as outputs: variable rate, fixed amount, fee description for each transaction txn_id. In examples, the fee description includes information or metadata describing the fee rate associated with a (seid, card_number) pair (e.g., merchant ID and card number pair). Examples of the fee description may include a string of alphanumeric characters and/or symbols. In some instance, the fee description may also include a unique hash number or identifier. Moreover, metadata information included with the fee description can include a type of merchant (e.g., retail, services, food/restaurant, etc.), industry or business area, type or category of product or service, card type, card product category, geographical location of a transaction (e.g., domestic or international), keyed transaction, manual transaction, etc.

Additionally, fee prediction job component 614 receives inputs including data from denorm charges 618, the ML model ID from ML model data 616, and most recent card tier data 608 where 1) when a (seid, card number) has been identified in most recent card tier data 608, fee prediction job component 614 uses the fee description from that, or 2) alternatively, fee prediction job component 614 uses the ML model to predict a fee description. In an embodiment, the denorm charges 618 comprises a set of transactions and associated metadata for such transactions, which are aggregated from multiple tables and then denormalized for storage into a single table. Such transactions may be from different merchants and may have been processed by the card network (e.g., card network 500) after being sent from the payment processor (e.g., payment processor 530).

Further, in an example, for a given reporting dataset, each fee can include a "fee description" associated with the discount. Further, in an example, each (seid, fee description) pair maps uniquely to a fee rate (variable rate, fixed cost). In embodiment, the fee rate can correspond to a network fee, or interchange fee, which a given card network (e.g., card network 500) charges for processing a given transaction, which can be based on a variable rate and a fixed cost as applied to a transaction amount as mentioned herein.

In embodiments described herein, when a fee description is predicted for a transaction, the subject technology can use a lookup table built from the same reporting dataset to determine the fee rate, and thus the fee amount. As mentioned herein "SEID" or "seid" refers to a merchant identifier (ID) with a given card network. In an example, the SEID can be a unique identifier that is associated with a merchant, which is utilized by the card network to process transactions that may be sent, by the payment processor, to the card network (e.g., on behalf of the merchant).

In an implementation, costs pipeline component 622 uses the (variable rate, fixed amount) for each transaction as provided by fee prediction job component 614 to determine costs (e.g., fee rates) for the card network. In an example, the costs pipeline component 622 aggregates (e.g., sums) each of the determined fee rates for each of the transactions to provide a total network cost (e.g., sum of the determined fee rates), which may be provided for display on a given electronic device (e.g., machine 400, client device 108). The total network cost can then be viewed in a given application where additional operations can be performed in response to the cost. For example if the total network cost surpasses a threshold cost amount, the merchant or customer may determine to submit fewer transactions to the payment processor or card network over a future time period (e.g., the subsequent month from the current month).

In an implementation, evaluation job component 624 uses the (variable rate, fixed amount) for each transaction as provided by fee prediction job component 614 to determine a result(s), and evaluates the result(s) against reporting data 626 (e.g., 7 days after).

In some implementations, the subject technology predicts the fee description instead of the fee amount (e.g., the fee rate charged by a given card network for processing a given transaction) directly for a few reasons:

- The description makes it easier for the subject technology to iterate during a prototype stage:
  - E.g. when the prediction indicates CONSUMER and the actual is PREPAID, the subject technology can infer the missing feature could be a card type.
- Having an explicit lookup table allows us to better monitor/inspect the output later in production As described herein, the follow phrases or terms refer to the following:

a. Most recent card tier: the most recent observed fee description (from reporting data) for a (seid, card number) pair.
   i. For other metadata search for a direct observed card tier.

b. Most recent actual rate: the most recent observed (variable rate, fixed cost) (from reporting data) for a (seid, fee description) pair.
   i. For other metadata search for direct actual rate.

Figure 7:
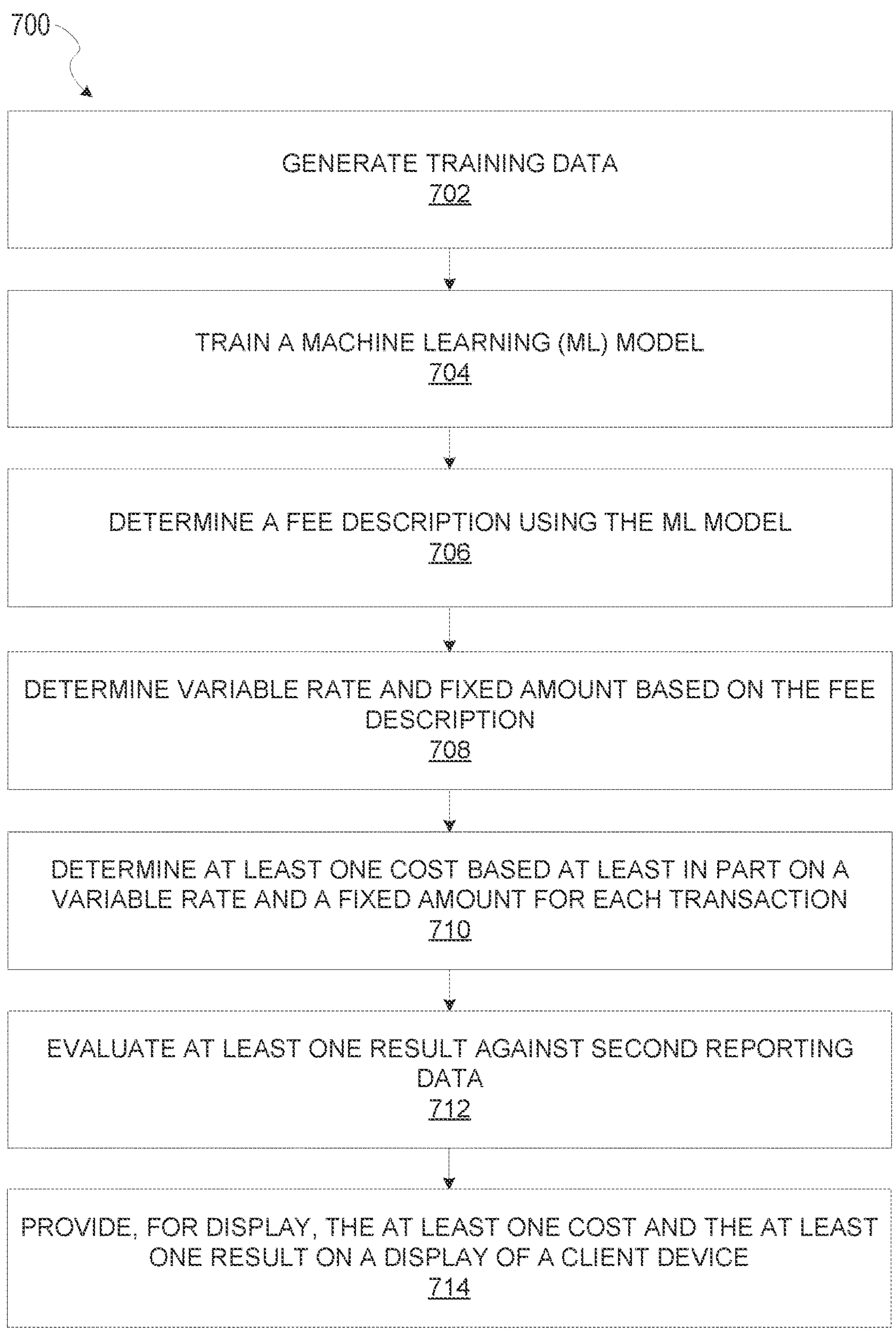
FIG. 7 is a flow diagram illustrating a method for determining network costs, in accordance with some embodiments of the present disclosure.

FIG. 7 is a flow diagram illustrating a method for determining network costs, in accordance with some embodiments of the present disclosure, in accordance with some embodiments of the present disclosure. The method 700 may be embodied in computer-readable instructions for execution by one or more hardware components (e.g., one or more processors) such that the operations of the method 700 may be performed by components of software architecture 600. Accordingly, the method 700 is described below, by way of example with reference thereto. However, it shall be appreciated that the method 700 may be deployed on various other hardware configurations and is not intended to be limited to deployment within of software architecture 600

At operation 702, data generation job component 604 generates training data based at least in part on reporting data from a card network.

In some embodiments, the training data comprises a number of samples for a pair of values from the reporting data, the pair of values comprising a merchant identifier and a credit card number.

In some embodiments, data generation job component 604 generates a lookup table based at least in part on the reporting data, the reporting data comprising information related to most recent card tiers and most recent actual rates.

At operation 704, ML training job component 612 trains a machine learning model based on the training data.

At operation 706, fee prediction job component 614 determines, using the machine learning model, a fee description for a transaction.

In some embodiments, the machine learning model generates a prediction, the prediction comprising the fee description, the machine learning model comprising a machine learning classifier, the machine learning classifier comprises a set of gradient boosted decision trees. In some example, the machine learning classifier receives a set of input features, the set of input features comprising one or more of a merchant identifier, bank identification number, last four numbers from a credit card number, or card type, the card type comprises one of a credit card, debit card, or prepaid card.

At operation 708, fee prediction job component 614 determine a variable rate and a fixed amount based at least in part on the fee description.

In some embodiments, fee prediction job component 614 determines the variable rate and the fixed amount based at least in part on the fee description by performing a lookup on the lookup table to determine a particular rate among the most recent actual rates that is associated with the fee description, and wherein the fee description comprises one or more of a card tier, the card tier based at least in part on a card type and a product family, the card type comprising a consumer card or a corporate card, the product family comprising a particular category of card provided by the card network.

In some embodiments, the most recent card tiers comprises a most recent fee description from the reporting data for a merchant identifier and a credit card number.

In some examples, the most recent actual rates comprise at least a most recent pair of values from the reporting data, the most recent pair of values comprising a particular variable rate and a particular fixed cost for a second pair of values, the second pair of value comprising a merchant identifier and a fee description.

In some embodiments, the machine learning model accesses the lookup table to obtain the reporting data as input data to the machine learning model.

At operation 710, costs pipeline component 622 determines at least one cost based at least in part the variable rate and the fixed amount for each transaction from a set of transactions.

In some embodiments, the at least one cost comprises a particular fee rate associated with a transaction between a payment processor and a card network, the particular fee rate being charged by the card network for processing the transaction based on a request from the payment processor on behalf of a merchant.

At operation 712, evaluation job component 624 evaluates at least one result against second reporting data, the at least one result comprising a cost of a particular transaction from the set of transactions, the cost of the particular transaction comprising a fee rate associated with the particular transaction.

In some embodiments, evaluating at least one result against second reporting data is based on new reporting data, the new reporting data including additional data including at least one transaction with a subsequent timestamp from a particular timestamp of a particular transaction associated with the reporting data, the particular transaction being a latest transaction from the reporting data.

At operation 714, dashboard UI component 630 provides, for display, the at least one cost and the at least one result on a display of a client device.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., a processor 540 in FIG. 5) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant (e.g., a merchant 510 of FIG. 5) and merchant servers (e.g., merchant servers 512 of FIG. 5) are associated with the merchant site. The merchant site is associated with a client-side application and a server-side application. In one example embodiment, the merchant site includes the merchant servers 512 of FIG. 5, and the server-side application executes on the merchant servers 512.

"Payment Processor" in this context (e.g., a payment processor 530 in FIG. 5) refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

With reference to a high-level description illustrated in FIG. 5, in some examples described more fully below, the payment processor includes selected functionality of both the payment processor 530 and the processor 540/card networks 550. For example, the payment processor 530 creates tokens and maintains and verifies publishable (non-secret) keys and secret keys. In the illustrated example, the processor 540/card networks 550 are involved in authorizing or validating payment information. In one example embodiment, the payment processor 530 and the processor 540/card networks 550 function together to authorize and validate payment information, issue a token, and settle any charges that are made. Accordingly, in this embodiment, "payment processor" refers to the functionality of the payment processor 530 and the functionality of the processor 540/card networks 550. In another example embodiment, wherein step (3) in the high-level description is not performed, and the payment processor 530 performs its own verification before issuing a token, the processor 540/card networks 550 are still used for settling any charges that are made, as described in step (7). Accordingly, in this embodiment, "payment processor" may refer only to the functionality of the payment processor 530 with respect to issuing tokens. Further, in the example arrangement shown, the payment processor 530, the processor 540, and the card networks 550 are shown as separate entities. In some examples, their respective functions may be performed by two entities, or even just one entity, with the entities themselves being configured accordingly.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2018, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method performed by one or more processors of a payment processing server system, the method comprising:

generating, by the payment processing server system, via execution of a data generation job on the one or more processors that generates most recent card tier data and most recent actual rate data, training data based at least in part on reporting data from a card network provided by a card network provider;

training, by the payment processing server system, via execution of a machine learning training job on the one or more processors, a machine learning model using the training data to generate a predicted fee description identifier corresponding to an input card transaction event, wherein the machine learning model comprises a machine learning classifier comprising a set of gradient boosted decision trees;

over a first period of time, receiving and processing, over a card network, a first set of card transaction events associated with a first entity wherein each card transaction event incurs a cost to the first entity that is specific to each card transaction event, wherein an actual cost for each card transaction event is unknown and indeterminable to the payment processing server system when each card transaction event is received;

determining, using the machine learning model, a respective predicted fee description identifier for each respective card transaction event in the first set of card transaction events over the first period of time, wherein the respective predicted fee description identifier is distinct from a respective fee amount for each respective card transaction event;

determining, as a predicted cost, a combination of a most recent actual variable rate and a most recent actual fixed amount for each respective card transaction event in the first set of card transaction events using a dynamically updated lookup table constructed from recent reporting data received from the card network provider and the respective predicted fee description identifier for each respective card transaction event, wherein determining the most recent actual variable rate and the most recent actual fixed amount comprises performing a lookup operation on the lookup table to determine the most recent actual variable rate and the most recent actual fixed amount associated with the respective predicted fee description identifier for a card transaction event corresponding to the recent reporting data, wherein the lookup table comprises a fee-description-indexed lookup data structure stored in memory of the payment processing server system and mapping respective pairs of a merchant identifier with the card network and a fee description identifier to corresponding pairs of variable rates and fixed cost values derived from the recent reporting data, and wherein the machine learning model predicts the fee description identifier instead of directly predicting the predicted cost;

responsive to receipt of each card transaction event and prior to receipt of settlement information indicating an actual network cost for the card transaction event, performing, by the one or more processors at runtime for the card transaction event, a memory-resident lookup on the fee-description-indexed lookup data structure using the predicted fee description identifier to obtain the most recent actual variable rate and the most recent actual fixed amount, thereby avoiding runtime evaluation of hard-coded decision trees and parsing of rule configuration files;

determining, by the payment processing server system, a predicted total cost for the first set of card transaction events based at least in part on each predicted cost for each respective predicted fee description identifier including the most recent actual variable rate and the most recent actual fixed amount for each respective card transaction event of the first set of card transaction events;

providing, by the payment processing server system, for display at a client device, the predicted total cost for the first set of card transaction events over the first period of time, wherein the client device is associated with the first entity;

updating, by the payment processing server system, the lookup table using more recent reporting data received from the card network provider;

responsive to providing the predicted total cost to the client device, receiving, over a second period of time subsequent to the first period of time, a second set of card transaction events associated with the first entity for the card network provider, wherein the second set of card transaction events comprise a second volume of second card transaction events different than a first volume of card transaction events of the first set of card transaction events, wherein a difference in the second volume is based on a change in transaction behavior by the first entity in response to the predicted total cost for the first entity to control fee exposure in real time and prior to obtaining an actual total cost for the first set of card transaction events; and processing the second set of card transaction events using the same trained machine learning model and the dynamically updated lookup table.

2. The method of claim 1, further comprising:

generating the lookup table, using the recent reporting data comprising information related to most recent card tiers and most recent actual rates, wherein determining the most recent actual variable rate and the most recent actual fixed amount based at least in part on the respective predicted fee description identifier comprises:

performing a lookup on the lookup table to determine a particular rate among the most recent actual rates that is associated with the predicted fee description identifier, and wherein the predicted fee description identifier comprises one or more of a card tier, the card tier based at least in part on a card type and a product family, the card type comprising a consumer card or a corporate card, the product family comprising a particular category of card provided by the card network, a string of alphanumeric characters and/or symbols, a unique hash number or identifier, or a geographical location of the first set of card transaction events.

3. The method of claim 2, wherein the most recent card tiers comprises a most recent fee description from the recent reporting data for a merchant identifier and a credit card number.

4. The method of claim 2, wherein the most recent actual rates comprise at least a most recent pair of values from the recent reporting data, the most recent pair of values comprising a particular variable rate and a particular fixed cost for a second pair of values, the second pair of values comprising a merchant identifier and a fee description.

5. The method of claim 2, wherein the machine learning model accesses the lookup table to obtain the recent reporting data as input data to the machine learning model.

6. The method of claim 1, wherein the machine learning model comprises a machine learning classifier, wherein the machine learning classifier comprises a set of gradient boosted decision trees.

7. The method of claim 6, wherein the machine learning classifier receives a set of input features, the set of input features comprising one or more of a merchant identifier, bank identification number, last four numbers from a credit card number, or card type, the card type comprises one of a credit card, debit card, or prepaid card.

8. The method of claim 1, wherein the lookup table comprises the most recent actual variable rate and the most recent actual fixed amount of one or more card transaction events of a most recent reporting data between a payment processor and the card network, the most recent actual variable rate and the most recent actual fixed amount being used by the card network for processing the one or more card transaction events based on a request from the payment processor on behalf of a merchant.

9. The method of claim 1, wherein the training data comprises a number of samples for a pair of values from the recent reporting data, the pair of values comprising a merchant identifier and a credit card number.

10. The method of claim 1, wherein determining the predicted total cost for the first set of card transaction events comprises:

determining the predicted cost for each card transaction event of the first set of card transaction events based at least in part on the most recent actual variable rate and the most recent actual fixed amount; and determining the predicted total cost for the first set of card transaction events by aggregating the cost for each card transaction event of the first set of card transaction events.

11. The method of claim 1, wherein the second volume of second card transaction events in the second set of card transaction events is less than the first volume of first card transaction events in the first set of card transaction events.

12. The method of claim 1, further comprising evaluating a result of the predicted cost against reported data indicating a respective actual event cost.

13. A system comprising:

a network;

one or more processors; and a memory storing instructions that, when executed by at least one processor among the one or more processors, cause the at least one processor to perform operations comprising, as a payment processing server system:

generating, via execution of a data generation job on the one or more processors that generates most recent card tier data and most recent actual rate data, training data based at least in part on reporting data from a card network provided by a card network provider;

training, via execution of a machine learning training job on the one or more processors, a machine learning model using the training data to generate a predicted fee description identifier corresponding to an input card transaction event, wherein the machine learning model comprises a machine learning classifier comprising a set of gradient boosted decision trees;

over a first period of time, receiving and processing, over a card network, a first set of card transaction events associated with a first entity wherein each card transaction event incurs a cost to the first entity that is specific to each card transaction event, wherein an actual cost for each card transaction event is unknown and indeterminable to the payment processing server system when each card transaction event is received;

determining, using the machine learning model, a respective predicted fee description identifier for each respective card transaction event in the first set of card transaction events over the first period of time, wherein the respective predicted fee description identifier is distinct from a respective fee amount for each respective card transaction event;

determining, as a predicted cost, a combination of a most recent actual variable rate and a most recent actual fixed amount for each respective card transaction event in the first set of card transaction events using a dynamically updated lookup table constructed from recent reporting data received from the card network provider and the respective predicted fee description identifier for each respective card transaction event, wherein determining the most recent actual variable rate and the most recent actual fixed amount comprises performing a lookup operation on the lookup table to determine the most recent actual variable rate and the most recent actual fixed amount associated with the respective predicted fee description identifier for a card transaction event corresponding to the recent reporting data, wherein the lookup table comprises a fee-description-indexed lookup data structure stored in memory of the payment processing server system and mapping respective pairs of a merchant identifier with the card network and a fee description identifier to corresponding pairs of variable rates and fixed cost values derived from the recent reporting data, and wherein the machine learning model predicts the fee description identifier instead of directly predicting the predicted cost;

responsive to receipt of each card transaction event and prior to receipt of settlement information indicating an actual network cost for the card transaction event, performing, by the one or more processors at runtime for the card transaction event, a memory-resident lookup on the fee-description-indexed lookup data structure using the predicted fee description identifier to obtain the most recent actual variable rate and the most recent actual fixed amount, thereby avoiding runtime evaluation of hard-coded decision trees and parsing of rule configuration files;

determining, by the payment processing server system, a predicted total cost for the first set of card transaction events based at least in part on each predicted cost for each respective predicted fee description identifier including the most recent actual variable rate and the most recent actual fixed amount for each respective card transaction event of the first set of card transaction events; and providing, by the payment processing server system, for display at a client device, the predicted total cost for the first set of card transaction events over the first period of time, wherein the client device is associated with the first entity;

updating, by the payment processing server system, the lookup table using more recent reporting data received from the card network provider;

responsive to providing the predicted total cost to the client device, receiving, over a second period of time subsequent to the first period of time, a second set of card transaction events associated with the first entity for the card network provider, wherein the second set of card transaction events comprise a second volume of second card transaction events different than a first volume of card transaction events of the first set of card transaction events, wherein a difference in the second volume is based on a change in transaction behavior by the first entity in response to the predicted total cost for the first entity to control fee exposure in real time and prior to obtaining an actual total cost for the first set of card transaction events; and processing the second set of card transaction events using the same trained machine learning model and the dynamically updated lookup table.

14. The system of claim 13, wherein the operations further comprise:

generating the lookup table, using the recent reporting data comprising information related to most recent event tiers and most recent actual rates, wherein determining the most recent actual variable rate and the most recent actual fixed amount based at least in part on the respective predicted fee description identifier comprises:

performing a lookup on the lookup table to determine a particular rate among the most recent actual rates that is associated with the predicted fee description identifier, and wherein the predicted fee description identifier comprises one or more of a card tier, the card tier based at least in part on a card type and a product family, the card type comprising a consumer card or a corporate card, the product family comprising a particular category of card provided by the card network, a string of alphanumeric characters and/or symbols, a unique hash number or identifier, or a geographical location of the card transaction event.

15. The system of claim 14, wherein the most recent actual rates comprise at least a most recent pair of values from the recent reporting data, the most recent pair of values comprising a particular variable rate and a particular fixed cost for a second pair of values, the second pair of values comprising a merchant identifier and a fee description.

16. The system of claim 14, wherein the machine learning model accesses the lookup table to obtain the recent reporting data as input data to the machine learning model.

17. The system of claim 13, wherein the machine learning model comprises a machine learning classifier, wherein the machine learning classifier comprises a set of gradient boosted decision trees.

18. The system of claim 17, wherein the machine learning classifier receives a set of input features, the set of input features comprising one or more of a merchant identifier, bank identification number, last four numbers from a credit card number, or card type, the card type comprises one of a credit card, debit card, or prepaid card.

19. The system of claim 13, wherein the lookup table comprises the most recent actual variable rate and the most recent actual fixed amount of one or more card transaction events of a most recent reporting data between a payment processor and the card network, the most recent actual variable rate and the most recent actual fixed amount being used by the card network for processing the one or more card transaction events based on a request from the payment processor on behalf of a merchant.

20. A non-transitory machine-readable medium comprising instructions which, when read by a machine comprising one or more processors of a payment processing server system, cause the machine to perform operations comprising:

generating, via execution of a data generation job on the one or more processors that generates most recent card tier data and most recent actual rate data, training data based at least in part on reporting data from a card network provided by a card network provider;

training, via execution of a machine learning training job on the one or more processors, a machine learning model using the training data to generate a predicted fee description identifier corresponding to an input card transaction event, wherein the machine learning model comprises a machine learning classifier comprising a set of gradient boosted decision trees;

over a first period of time, receiving and processing, over a card network, a first set of card transaction events associated with a first entity wherein each card transaction event incurs a cost to the first entity that is specific to each card transaction event, wherein an actual cost for each card transaction event is unknown and indeterminable to the payment processing server system when each card transaction event is received;

determining, using the machine learning model, a respective predicted fee description identifier for each respective card transaction event in the first set of card transaction events over the first period of time, wherein the respective predicted fee description identifier is distinct from a respective fee amount for each respective card transaction event;

determining, as a predicted cost, a combination of a most recent actual variable rate and a most recent actual fixed amount for each respective card transaction event in the first set of card transaction events using a dynamically updated lookup table constructed from recent reporting data received from the card network provider and the respective predicted fee description identifier for each respective card transaction event, wherein determining the most recent actual variable rate and the most recent actual fixed amount comprises performing a lookup operation on the lookup table to determine the most recent actual variable rate and the most recent actual fixed amount associated with the respective predicted fee description identifier for a card transaction event corresponding to the recent reporting data, wherein the lookup table comprises a fee-description-indexed lookup data structure stored in memory of the payment processing server system and mapping respective pairs of a merchant identifier with the card network and a fee description identifier to corresponding pairs of variable rates and fixed cost values derived from the recent reporting data, and wherein the machine learning model predicts the fee description identifier instead of directly predicting the predicted cost;

responsive to receipt of each card transaction event and prior to receipt of settlement information indicating an actual network cost for the card transaction event, performing, by the one or more processors at runtime for the card transaction event, a memory-resident lookup on the fee-description-indexed lookup data structure using the predicted fee description identifier to obtain the most recent actual variable rate and the most recent actual fixed amount, thereby avoiding runtime evaluation of hard-coded decision trees and parsing of rule configuration files:

determining, by the payment processing server system, a predicted total cost for the first set of card transaction events based at least in part on each predicted cost for each respective predicted fee description identifier including the most recent actual variable rate and the most recent actual fixed amount for each respective card transaction event of the first set of card transaction events; and providing, by the payment processing server system, for display at a client device, the predicted total cost for the first set of card transaction events over the first period of time, wherein the client device is associated with the first entity;

updating, by the payment processing server system, the lookup table using more recent reporting data received from the card network provider;

responsive to providing the predicted total cost to the client device, receiving, over a second period of time subsequent to the first period of time, a second set of card transaction events associated with the first entity for the card network provider, wherein the second set of card transaction events comprise a second volume of second card transaction events different than a first volume of card transaction events of the first set of card transaction events, wherein a difference in the second volume is based on a change in transaction behavior by the first entity in response to the predicted total cost for the first entity to control fee exposure in real time and prior to obtaining an actual total cost for the first set of card transaction events; and processing the second set of card transaction events using the same trained machine learning model and the dynamically updated lookup table.

* * * * *